United States Patent
Baldemair et al.

(10) Patent No.: US 12,224,960 B2
(45) Date of Patent: Feb. 11, 2025

(54) CONTROL SIGNALING STRUCTURE

(71) Applicant: Telefonaktiebolaget LM Ericsson (publ), Stockholm (SE)

(72) Inventors: Robert Baldemair, Solna (SE); Mehrnaz Afshang, San Jose, CA (US); Rikke Apelfrojd, Stockholm (SE); Jung-Fu Cheng, Fremont, CA (US); Ning He, Sollentuna (SE); Dennis Hui, Sunnyvale, CA (US); Stefan Parkvall, Bromma (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/417,121

(22) Filed: May 20, 2019

(65) Prior Publication Data
US 2020/0374066 A1 Nov. 26, 2020

(51) Int. Cl.
*H04L 5/00* (2006.01)
*H04L 27/26* (2006.01)

(52) U.S. Cl.
CPC ........ *H04L 5/0053* (2013.01); *H04L 27/2605* (2013.01); *H04L 27/2626* (2013.01); *H04L 27/2647* (2013.01); *H04L 5/0048* (2013.01)

(58) Field of Classification Search
CPC ............... H04L 5/0048; H04L 27/2605; H04L 27/2626; H04L 27/2647
See application file for complete search history.

(56) References Cited

U.S. PATENT DOCUMENTS

| | | | | |
|---|---|---|---|---|
| 2010/0016023 | A1* | 1/2010 | Yamauchi | H04B 7/0695 455/562.1 |
| 2011/0110357 | A1* | 5/2011 | Chung | H04W 48/08 370/344 |

(Continued)

FOREIGN PATENT DOCUMENTS

WO 2017150918 A1 9/2017

OTHER PUBLICATIONS

International Search Report and Written Opinion dated Jul. 21, 2020 for International Application No. PCT/SE2020/050419 filed on Apr. 27, 2020, consisting of 15-pages.
(Continued)

*Primary Examiner* — Sam K Ahn
*Assistant Examiner* — Amneet Singh
(74) *Attorney, Agent, or Firm* — Weisberg I.P. Law, P.A.

(57) ABSTRACT

There is disclosed a method of operating a transmitting node in a millimeter-wave communication network. The method includes transmitting millimeter-wave signaling in a transmission timing structure, the transmission timing structure including N time interval elements sequentially ordered in time, the millimeter-wave signaling including N separate signaling structures, each signaling structure being transmitted in a different one of the time interval elements. N is an integer multiple of 2. A first subset of the N separate signaling structures corresponds to control signaling, the subset including $2^m$ signaling structures consecutive in time beginning with the signaling structure of the first time interval element, and m is an integer such that $2^m<=N$. A second subset of the N separate signaling structures corresponds to data signaling, the second subset comprising 0 or an integer number of signaling structures. The disclosure also pertains to related devices and methods.

9 Claims, 3 Drawing Sheets

(56) References Cited

U.S. PATENT DOCUMENTS

2012/0320872 A1* 12/2012 Yang .................... H04L 5/0053
370/330
2019/0342865 A1* 11/2019 Shin .................... H04W 72/042
2020/0267710 A1* 8/2020 Zhang .................. H04L 5/0046

OTHER PUBLICATIONS

Funada et al. "Novel Frame Design Methodology for Multi-gigabit 60GHz WPAN Systems" National Institute of Information and Communication Technology; 19th Annual IEEE International Symposium on Personal, Indoor and Mobile Radio Communications, 2008, consisting of 5-pages.

3GOO TSG RAN WG1 Meeting #86 R1-167395; Title: Views on NR frame structure; Source: NTT DOCOMO, Inc.; Agenda Item: 8.1.3.2; Document for: Discussion and Decision; Location and Date: Gothenburg, Sweden, Aug. 22-26, 2016, consisting of 7-pages.

* cited by examiner

CONTROL SIGNALING STRUCTURE

TECHNICAL FIELD

This disclosure pertains to wireless communication technology, in particular for high frequencies.

BACKGROUND

For future wireless communication systems, use of higher frequencies are considered, which allow large bandwidths to be used for communication. However, the use of such higher frequencies brings new problems, e.g. regarding physical properties and timing. With the introduction of high carrier frequencies, increasingly larger bandwidths may be used for signaling. For example, in 5G, carrier bandwidths are usually limited to 100 MHz or several 100 MHz, whereas for high frequencies bandwidths of 1 GHz or 2 GHz or even more are considered. With increasing bandwidth, the associated symbol time interval in a numerology will decrease, and, accordingly, cyclic prefixes if used will be shorter as well.

SUMMARY

It is an object of this disclosure to provide improved approaches of handling wireless communication, in particular to provide a suitable control signaling structure especially for uplink or sidelink. The approaches are particularly suitable for millimeter wave communication, in particular for radio carrier frequencies around and/or above 52.6 GHz, which may be considered high radio frequencies and/or as millimeter waves. The radio nodes and/or network described herein may operate in wideband, e.g. with a carrier bandwidth of 1 GHz or more, or 2 GHz or more, or even larger. In some cases, operation may be based on a single carrier waveform, e.g. SC-FDE (Frequency Domain Equalisation) or SC-FDMA, but some variants may utilise an OFDM based waveform, at least in one direction. Different waveforms may be used for different communication directions.

The approaches are particularly advantageously implemented in a 5th Generation (5G) telecommunication network or 5G radio access technology or network (RAT/RAN), in particular according to 3GPP ($3^{rd}$ Generation Partnership Project, a standardisation organization). A suitable RAN may in particular be a RAN according to NR, for example release 15 or later, or LTE Evolution. However, the approaches may also be used with other RAT, for example future 5.5G or 6G systems or IEEE systems.

There is disclosed a method of operating a transmitting node in a millimeter-wave communication network. The method comprises transmitting communication signaling in a transmission timing structure, the communication signaling comprising an integer multiple of 2 number N of signaling blocks. A subset of M of the signaling blocks represents control signaling. The communication signaling further comprises one or more reference signaling elements, the position of the one or more reference signaling elements in the transmission timing structure being dependent on M and/or the location of the M signaling blocks representing control signaling in the transmission timing structure.

Moreover, a transmitting node for a millimeter-wave communication network is considered. The transmitting node is adapted to transmit communication signaling in a transmission timing structure, the communication signaling comprising an integer multiple of 2 number N of signaling blocks. A subset of M of the signaling blocks represents control signaling. The communication signaling further comprises one or more reference signaling elements, the position of the one or more reference signaling elements in the transmission timing structure being dependent on M and/or the location of the M signaling blocks representing control signaling in the transmission timing structure.

A method of operating a receiving node in a millimeter-wave communication network is also considered. The method comprises receiving communication signaling in a transmission timing structure, the communication signaling comprising an integer multiple of 2 number N of signaling blocks. A subset of M of the signaling blocks represents control signaling. The communication signaling further comprises one or more reference signaling elements, the position of the one or more reference signaling elements in the transmission timing structure being dependent on M and/or the location of the M signaling blocks representing control signaling in the transmission timing structure.

Further, a receiving node for a millimeter-wave communication network is described. The receiving node is adapted to receive communication signaling in a transmission timing structure, the communication signaling comprising an integer multiple of 2 number N of signaling blocks. A subset of M of the signaling blocks represents control signaling. The communication signaling further comprises one or more reference signaling elements, the position of the one or more reference signaling elements in the transmission timing structure being dependent on M and/or the location of the M signaling blocks representing control signaling in the transmission timing structure.

The approaches described herein allow efficient communication signaling, with a suitable arrangement of reference signaling, which may in particular be DM-RS signaling. The transmission structure used may be easily determined implicitly, limiting the amount of signaling overhead. In general, the position of one or more reference signaling elements may also indicate the number of reference signaling elements.

It should be noted that M and/or the location of the M signaling blocks and/or N-M data signaling blocks may be based on a configuration and/or be scheduled, and/or be in response to scheduling control signaling, e.g. scheduling grants and/or scheduling assignments, which may for example be provided by the receiving node.

Accordingly, the receiving node may have an expectation of the structure of the communication signaling to be received. Receiving may comprise performing demodulation and/or decoding based on such configuration and/or scheduling and/or expectation. This may in particular facilitate error detection, as from an unexpected received structure an error may be determined.

A reference signaling element may represent DMRS signaling and/or may be represented by a reference signaling time-domain sequence. The reference signaling element may be included into a signaling block, or may be in a separate and/or own signaling block.

The M signaling blocks representing control signaling may be arranged in sequence in time, such that each of the blocks is adjacent or neighboring in time to at least one other of the M blocks representing control signaling, and/or to form a group of signaling blocks representing control signaling, e.g. separate control signaling instances. A signaling block representing control signaling may also be referred to as control signaling block, analogous may a signaling block representing data signaling be referred to as data signaling block. A signaling block may also in general be referred to as signaling structure. Data signaling blocks, if present, may be arranged in sequence in time, such that each of the blocks is adjacent or neighboring in time to at least one other data signaling blocks, and/or to form a group of data signaling blocks. The group of control signaling blocks may be trailing the group of data signaling blocks, being arranged later in time, or vice versa. The position of one of the groups and/or both groups and/or one or more of the blocks may be predefined or configured or configurable, e.g. with higher layer signaling like RRC signaling and/or with physical layer signaling, e.g. Downlink Control Information, DCI, signaling.

It may be considered that the communication signaling is uplink signaling, and/or the control signaling may represent Uplink Control Information, UCI. The structure of communication signaling is particularly suitable for uplink transmission and/or for transmission with only one intended target, e.g. a network node.

One of the one or more reference signaling elements may be prefixed (e.g., lead in time and/or neighbouring and/or adjacent) to the first in time domain of the M signaling blocks representing control signaling. Thus, important information like control information may be easy to demodulate due to closely arranged reference signaling. Alternatively, or additionally, a second reference signaling element may be prefixed to the first of data signaling blocks, if present in the communication signaling. This facilitates quick demodulation of different types of signaling. In some variants, a group of control signaling blocks may have associated to it a leading reference signaling element and a trailing reference signaling element, which may have the same reference signaling time domain sequence (e.g., in the same sequence or in reverse), e.g. a first reference signaling time domain sequence. This may provide a cyclic prefix for the control signaling block group. The presence of a trailing reference signaling element may be dependent on M, e.g. for M=1, 2, the trailing element may be omitted. In some variants, a group of data signaling blocks may have alternatively or additionally associated to it a leading reference signaling element and a trailing reference signaling element, which may have the same reference signaling time domain sequence (e.g., in the same sequence or in reverse), e.g. a (different or the same to the sequence used for the control signaling block group) first reference signaling time domain sequence. This may provide a cyclic prefix for the data signaling block group. The presence of a trailing reference signaling element may be dependent on the number of data signaling blocks, for example if there are only one or two, the trailing element may be omitted.

In general, N-M signaling blocks may represent data signaling. However, if I reference signaling blocks should be present, N-M-I signaling blocks may represent data signaling. Thus, the transmission timing structure may be efficiently used even when not a lot of control signaling is to be transmitted.

It may be considered that N-M signaling blocks representing data signaling are arranged in time before the M signaling blocks representing control signaling. This facilitates easy identification and demodulation of control signaling, and also may allow sufficient processing time for determining information to be transmitted via control signaling.

In some variants, one reference signaling element may be provided at the beginning of the transmission timing structure, and a second reference signaling element may be provided between a signaling block representing data signaling and the closest signaling block (to the data signaling block) representing control signaling if a signaling block representing data signaling is included in the transmission timing structure. The data signaling block may be the last data signaling block in time domain. In general, for different types of signaling, different or specific reference signaling may be provided. It may generally be considered that data signaling and control signaling are transmitted with different transmission parameters, such as transmission power and/or modulation and coding scheme and/or beamforming parameters and/or antenna configuration, e.g. layers of transmission or extension of a beam. In particular in this case, common reference signaling for data and control may be not enough to facilitate demodulation and/or correct reception. Thus, reference signaling specific to a group of signaling blocks may be preferable.

It may be considered that the communication signaling may be transmitted based on a single carrier waveform. The communication signaling and/or millimeter-wave signaling and/or transmitting timing structure may have or carry a single carrier waveform. In particular, each signaling structure and/or time interval element may have or carry a single carrier waveform, which may be used to transmit the control signaling or data signaling associated to the signaling structure. Such a waveform may be particularly suitable for large bandwidth and/or carrier frequency, e.g. covering the bandwidth to a large degree.

The transmitting node may comprise, and/or be adapted to utilise, processing circuitry and/or radio circuitry, in particular a transmitter and/or transceiver, for transmitting the communication signaling. The receiving node may comprise, and/or be adapted to utilise, processing circuitry and/or radio circuitry, in particular a receiver and/or transceiver, for receiving the communication signaling.

A signaling block may correspond to a time interval element and/or may correspond to a symbol block. Different time interval elements or blocks may correspond to the same duration in time, or to different durations. A signaling block may be considered to carry signaling of the type it corresponds to. In some cases, a predetermined subset of samples of a transformation (e.g., FFT or IFFT) may be associated to a signaling block, which may be carried out over the transmission timing structure or a superstructure comprising the transmission timing structure. The subset may comprise a true subset of the samples, with a lower number of samples than the total number, e.g. a quarter or less of the samples, e.g. 1/N of the samples or less. A signaling block may also be referred to as signaling structure.

Reference signaling may in particular be DMRS and/or for demodulation and/or calibration, and/or error coding signaling, e.g. for error detection and/or error correction coding. The associated reference signaling may be in a separate signaling structure (the structure may carry the reference signaling and/or error coding signaling in addition to its control signaling or data signaling), or in some cases reference signaling may be provide in on signaling structure to be used for one or more other structures leading or trailing in time.

A signaling structure and/or time interval element may correspond to a block or symbol block or control channel element or more than one control channel element.

It may be considered that the transmission timing structure corresponds to a symbol time interval, e.g. analogous to an OFDM symbol duration and/or according to a numerology.

It may be considered that the transmission timing structure and/or the communication signaling comprises a cyclic prefix or suffix. There may be a common cyclic prefix, which may be common to a group of control signaling blocks and/or a group of data signaling blocks.

It may be considered that the transmission timing structure is embedded into a larger structure comprising an integer number of transmission timing structures, which in some examples may correspond to 14 or less, or 12 or less, or 7 or less. The larger structure may be considered a superstructure, and/or may correspond to a slot or subframe.

The communication signaling may be millimeter-wave signaling, mmW signaling.

Reference signaling may comprise and/or be implemented in a time-domain sequence, e.g. a predefined and/or configured or configurable. The sequence of the common RS may be referred to as common sequence or common time-domain sequence. Control signaling and/or data signaling may be represented by time-domain sequences.

The transmitting node may be a radio node, in particular a wireless device like a terminal or UE. The receiving node may be a radio node, in particular a network node, or a wireless device, e.g. in a sidelink scenario. The mmW signaling or communication signaling may in particular be uplink or sidelink signaling.

Reference signaling common to control signaling and data signaling may in particular be arranged in time domain between the control signaling and the data signaling. This facilitates good demodulation for both signalings. The reference signaling may correspond to intermediate reference signaling. Such common reference signaling may be in a reference signaling element common to a group of data signaling blocks and a group of control signaling blocks, e.g. between them. The presence of such a common RS element may be dependent on whether transmission characteristics for both groups are the same, in particular regarding beamforming and/or antenna array usage and/or number of layers, or not. If they are not, a common RS element may be omitted.

The mmW or communication signaling may comprise leading reference signaling in a leading time interval at the beginning of the transmission timing structure and/or may comprise trailing reference signaling in a trailing time interval at the end of the transmission timing structure, and/or at the end of a leading group of signaling blocks, e.g. of data signaling blocks. The leading reference signaling may start with a first reference signaling time-domain sequence, and/or the trailing reference signaling may end with the first reference time-domain signaling sequence, or a different sequence. The leading RS starting with the first RS time-domain sequence may represent the mmW or communication signaling having modulation symbols of the first RS time-domain sequence at the beginning. In some variants, there may be a guard interval before, and alternatively, or additionally, no other symbols of the mmW signaling associated to the transmission timing structure. The trailing RS starting with the first RS time-domain sequence may represent the communication signaling having modulation symbols of the first RS time-domain sequence at the end, in the same order as at the beginning, or in some cases reversed. There may be a guard interval thereafter, and alternatively, or additionally, no other symbols of the communication signaling associated to the transmission timing structure. A RS time-domain sequence may in general be predefined, or configured or configurable. These approaches described herein allow using the reference signaling as cyclic prefix (and/or appendix/suffix, depending on view). Quick demodulation of signaling is enabled, while orthogonality and/or reliable transformation is facilitated. Demodulating on a sub-symbol level may be performed in some variants.

The reference signaling may be associated to control and/or data signaling, e.g. for demodulation. Receiving mmW signaling may comprise demodulating the control signaling and data signaling based on reference signaling, in particular the common RS. The mmW or communication signaling may be beamformed.

In some variants, the mmW or communication signaling and/or transmission timing structure may comprise, in an intermediate time interval between the leading time interval and the trailing time interval, intermediate reference signaling, which may be the common RS. The intermediate RS may comprise the common sequence, which may be the first RS time-domain sequence or a different sequence. In some variants there may be prefixed and/or appended a second and/or third RS time-domain sequence.

A program product comprising instructions causing processing circuitry to control and/or perform a method as described herein may be considered. Also, a carrier medium arrangement carrying and/or storing a program product as described herein is disclosed.

A transmission timing structure may correspond to a symbol time interval and/or have a symbol duration, e.g. the equivalent of an OFDM symbol time interval, for example according to a numerology. A transmission timing structure may be divided and/or dividable in a plurality of time interval elements, which may be referred to as timing blocks or signaling blocks, e.g. symbol blocks. When processing the signaling to transmit and/or receive the transmission timing structure, time interval elements or blocks of a transmission timing structure may undergo common transform in a transformation and/or filter, e.g. FFT (Fast Fourier Transform) or DFT (Discrete Fourier Transform) or IFFT (Inverse FFT). In some variants, a block or blocks may be treated separately, e.g. by setting taps of a transformation to zero when they fall outside the block and/or blocks. The transmission timing structure may be embedded in a larger structure comprising a plurality of transmission timing structures, e.g. a slot or subframe. Signaling of the larger structure may undergo a transformation as described herein together. A block may comprise one or more modulation symbols and/or signals, e.g. a signal or (modulation) symbol sequence. A control channel element (CCE) may correspond to a time interval element, or a fraction thereof (in time domain), e.g. 1/L, wherein L may be an integer L with L one of 1, 2, 3, 4, 5, 6, 7 or 8, in particular 4 or less. A block thus may correspond to L CCEs in durations, in particular 2, 3 or 4 CCEs. The number of CCEs per block or time interval element may be predefined, or configured or configurable. The duration of a transmission timing structure and/or a time interval element may be predefined, and/or configured or configurable, in particular dependent on a numerology.

Signaling, e.g. the communication signaling, on a transmission timing structure and/or block and/or for a modulation symbol may extend in frequency domain over a bandwidth, which may for example be the carrier bandwidth or a (e.g., active or inactive or initial) bandwidth part, or a cover an interval having a (large) percentage thereof, e.g. at least 50%, at least 75%, at least 90% or more, e.g. for a single carrier waveform. A guard interval may be added at a lower frequency border and/or a higher frequency border. The bandwidth may be equal to or larger than 1 GHz, 1.5 GHz, 2 GHz or in between. A numerology may be associated, which may indicate a symbol duration (duration of a symbol time interval), for example analogous to an OFDM system. The symbol duration may be smaller than $1\times10^{-6}$ s. A sequence may in particular a sequence in time domain, in which for example one modulation symbol of the sequence is followed by the other.

For a time-domain sequence in general, the modulation symbols may cover the same bandwidth, and/or may be arranged in pure time-domain sequence, e.g. without frequency-domain multiplexing (e.g., no two symbols are at the same time, but in different frequencies on the same carrier). A modulation symbol may represent a one of a number V of values depending on the modulation scheme used. A sequence may indicate which modulation symbols and/or values are to be transmitted. The sequence may in general be predefined or configured or configurable for reference signaling, or scheduled and/or be dynamic for control or data signaling, e.g. within a suitable or predefined or configured or configurable format, e.g. for control signaling.

Control signaling in different signaling structures or blocks may correspond to different control signaling messages and/or formats and/or instances, e.g. PSCCH or PUCCH instances. In general, different separate signaling structures or blocks may correspond to different messages and/or may be separately error coded, e.g. with error correction coding like Forward Error Correction (FEC) coding and/or may be formatted according to separate formats. It should be noted that signaling structures aimed at the same target may have different content, or may represent the same content, e.g. for repetitions associated to an aggregation level, which may increase likelihood of successful reception. The aggregation level may be configured or configurable, e.g. with RRC signaling and/or physical layer signaling.

Blocks may generally have the same duration, but in some cases may have different durations, e.g. to include a cyclic prefix or suffix and/or reference signaling element. It should be noted that a block may correspond to a time interval element, which may carry signaling in a sequence. Other forms of organising the transmission timing structure may be considered, e.g. by ordering a number of time-domain sequences. Control signaling and/or data signaling may be arranged in time-domain sequence/s representing the signaling.

In general, the location and/or number of reference signaling elements may be dependent on M and/or N and/or number of data signaling blocks and/or one or more operational parameters, in particular regarding signal quality and/or beam forming and/or number of transmission layers, or differences thereof between a group of data signaling blocks and a group of control signaling blocks, e.g. according to a configuration or scheduling. It should be noted that a group of blocks may comprise one or more blocks. Generally, reference signaling elements associated to a group may be transmitted such that they have at least some transmission or operational parameters that are the same as used for the group, in particular regarding beamforming (same beam solid angular distribution) and/or number of layers and/or antenna arrays or elements used and/or the same antenna port used. It may generally be considered that N, M and/or the number of data signaling blocks and/or other parameters based on which the location and/or number of reference signaling elements may be determined may be known to either of the nodes, e.g. due to being predefined and/or configured and/or scheduled.

BRIEF DESCRIPTION OF THE DRAWINGS

The drawings are provided to illustrate concepts and approaches described herein, and are not intended to limit their scope. The drawings comprise.

DETAILED DESCRIPTION

Figure 1:
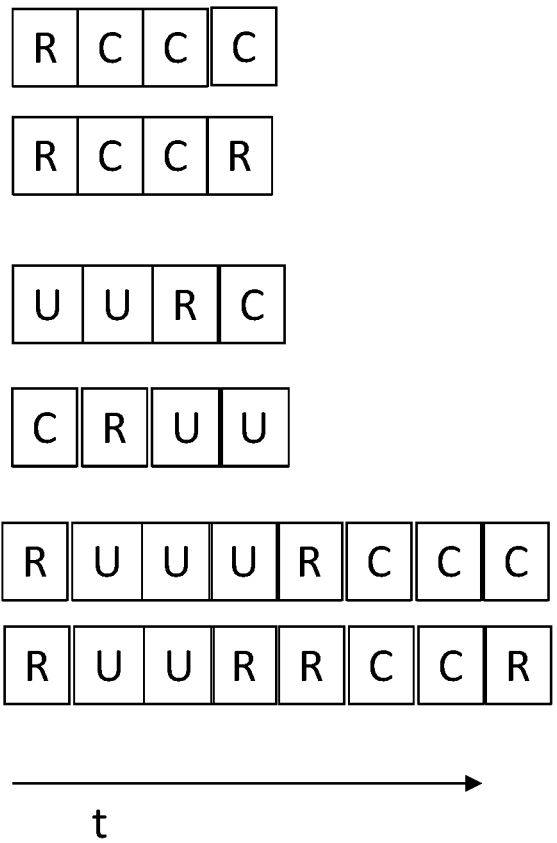
FIG. 1, showing exemplary transmission structures.

FIG. 1 shows exemplary transmission structures covering a transmission timing structure, which may comprise N signaling blocks. N=4 for the upper four examples, N=8 for the bottom two examples. The examples show different transmission timing structures that may be used in different times and/or scenarios, or alternatively to each other, not a set of structures used at the same time. The x-axis schematically indicates time t, such that blocks to the left are earlier in time than blocks to the right. R indicates a reference signaling block, which in the examples is represented as a separate block. C indicates a control signaling block, in particular for carrying uplink control information, and U indicates a data signaling block, in particular an uplink data signaling block. As can be seen, between different groups, there may be arranged a reference signaling element, which may be a common reference signaling element in particular if it is the only element (e.g., M=1 or 2, and number of data signaling blocks=2.1 for N=4). In the second example from the top, there are shown leading and trailing reference signaling elements surrounding two control signaling blocks. If the reference signaling elements have the same sequence, they may be used as cyclic prefix (and/or suffix), e.g. for orthogonalisation. This may be similar for the group of data signaling blocks and the group of control signaling blocks in the bottom example, wherein the R blocks associated to the different groups may have the same or different sequences. In the upper example with N=8, the R between the groups may represent a common reference signaling element, in particular if the same beam and/or antenna array and/or layer and/or antenna port is used for transmission. However, it may be considered that each group has associated to it a group-specific reference signaling element, e.g. prefixed as shown.

Figure 2:
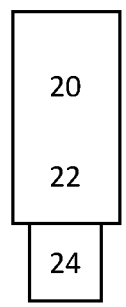
FIG. 2, showing an exemplary radio node.

FIG. 2 schematically shows a radio node, in particular a terminal 10 or a UE (User Equipment). Radio node 10 comprises processing circuitry (which may also be referred to as control circuitry) 20, which may comprise a controller connected to a memory. Any module of the radio node 10, e.g. a communicating module or determining module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g. a RAN as described herein, and/or for sidelink communication. Radio node 10 may generally be adapted to carry out any of the methods of operating a radio node like terminal or UE disclosed herein; in particular, it may comprise corresponding circuitry, e.g. processing circuitry, and/or modules, e.g. software modules. It may be considered that the radio node 10 comprises, and/or is connected or connectable, to a power supply.

Figure 3:
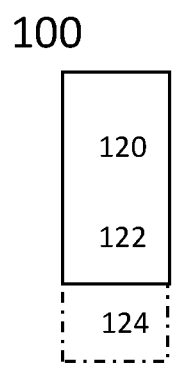
FIG. 3, showing another exemplary radio node.

FIG. 3 schematically show a radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating a radio node or network node disclosed herein; in particular, it may comprise corresponding circuitry, e.g. processing circuitry, and/or modules. The antenna circuitry 124 may be connected to and/or comprise an antenna array. The node 100, respectively its circuitry, may be adapted to perform any of the methods of operating a network node or a radio node as described herein; in particular, it may comprise corresponding circuitry, e.g. processing circuitry, and/or modules. The radio node 100 may generally comprise communication circuitry, e.g. for communication with another network node, like a radio node, and/or with a core network and/or an internet or local net, in particular with an information system, which may provide information and/or data to be transmitted to a user equipment.

Data signaling may be on a data channel, for example on a PDSCH or PSSCH, or on a dedicated data channel, e.g. for low latency and/or high reliability, e.g. a URLLC channel. Control signaling may be on a control channel, for example on a common control channel or a PDCCH or PSCCH, and/or comprise one or more DCI messages or SCI messages. Reference signaling may be associated to control signaling and/or data signaling, e.g. DM-RS and/or PT-RS.

Reference signaling, for example, may comprise DM-RS and/or pilot signaling and/or discovery signaling and/or synchronisation signaling and/or sounding signaling and/or phase tracking signaling and/or cell-specific reference signaling and/or user-specific signaling, in particular CSI-RS. Reference signaling in general may be signaling with one or more signaling characteristics, in particular transmission power and/or sequence of modulation symbols and/or resource distribution and/or phase distribution known to the receiver. Thus, the receiver can use the reference signaling as a reference and/or for training and/or for compensation. The receiver can be informed about the reference signaling by the transmitter, e.g. being configured and/or signaling with control signaling, in particular physical layer signaling and/or higher layer signaling (e.g., DCI and/or RRC signaling), and/or may determine the corresponding information itself, e.g. a network node configuring a UE to transmit reference signaling. Reference signaling may be signaling comprising one or more reference symbols and/or structures. Reference signaling may be adapted for gauging and/or estimating and/or representing transmission conditions, e.g. channel conditions and/or transmission path conditions and/or channel (or signal or transmission) quality. It may be considered that the transmission characteristics (e.g., signal strength and/or form and/or modulation and/or timing) of reference signaling are available for both transmitter and receiver of the signaling (e.g., due to being predefined and/or configured or configurable and/or being communicated). Different types of reference signaling may be considered, e.g. pertaining to uplink, downlink or sidelink, cell-specific (in particular, cell-wide, e.g., CRS) or device or user specific (addressed to a specific target or user equipment, e.g., CSI-RS), demodulation-related (e.g., DMRS) and/or signal strength related, e.g. power-related or energy-related or amplitude-related (e.g., SRS or pilot signaling) and/or phase-related, etc.

References to specific resource structures like transmission timing structure and/or symbol and/or slot and/or mini-slot and/or subcarrier and/or carrier may pertain to a specific numerology, which may be predefined and/or configured or configurable. A transmission timing structure may represent a time interval, which may cover one or more symbols. Some examples of a transmission timing structure are transmission time interval (TTI), subframe, slot and mini-slot. A slot may comprise a predetermined, e.g. predefined and/or configured or configurable, number of symbols, e.g. 6 or 7, or 12 or 14. A mini-slot may comprise a number of symbols (which may in particular be configurable or configured) smaller than the number of symbols of a slot, in particular 1, 2, 3 or 4, or more symbols, e.g. less symbols than symbols in a slot. A transmission timing structure may cover a time interval of a specific length, which may be dependent on symbol time length and/or cyclic prefix used. A transmission timing structure may pertain to, and/or cover, a specific time interval in a time stream, e.g. synchronized for communication. Timing structures used and/or scheduled for transmission, e.g. slot and/or mini-slots, may be scheduled in relation to, and/or synchronized to, a timing structure provided and/or defined by other transmission timing structures. Such transmission timing structures may define a timing grid, e.g., with symbol time intervals within individual structures representing the smallest timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology. The timing of a mini-slot may generally be configured or configurable, in particular by the network and/or a network node. The timing may be configurable to start and/or end at any symbol of the transmission timing structure, in particular one or more slots.

In general, a UE or wireless device may be configured with a reference signaling configuration, for example via control signaling, e.g. higher layer signaling like RRC signaling and/or MAC signaling, and/or physical layer signaling, e.g. DCI signaling. A reference signaling configuration may generally indicate resources for reference signaling, and/or a sequence (e.g., of modulation symbols), which may be mapped to the reference signaling resources of the indicated resources, and/or a cover code and/or cyclic shift to be applied to the sequence and/or resources, and/or the timing (e.g., on a slot or symbol level) of the reference signaling, and/or timing of providing a measurement report pertaining to the reference signaling and/or may indicate and/or may pertain to one or more beams, which may be transmission and/or reception beams. The measurement report may be periodic and/or semi-static, or aperiodic and/or dynamic, e.g. triggered by and/or in response to physical layer signaling, e.g. a scheduling grant or scheduling assignment. Resources for reference signaling may be represented by a set of resources, which may include resources, in particular resource elements, intended to carry and/or carrying reference signaling and/or associated symbols (e.g., modulation symbols).

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A system comprising one or more radio nodes as described herein, in particular a network node and a user equipment, is described. The system may be a wireless communication system, and/or provide and/or represent a radio access network.

Moreover, there may be generally considered a method of operating an information system, the method comprising providing information. Alternatively, or additionally, an information system adapted for providing information may be considered. Providing information may comprise providing information for, and/or to, a target system, which may comprise and/or be implemented as radio access network and/or a radio node, in particular a network node or user equipment or terminal. Providing information may comprise transferring and/or streaming and/or sending and/or passing on the information, and/or offering the information for such and/or for download, and/or triggering such providing, e.g. by triggering a different system or node to stream and/or transfer and/or send and/or pass on the information. The information system may comprise, and/or be connected or connectable to, a target, for example via one or more intermediate systems, e.g. a core network and/or internet and/or private or local network. Information may be provided utilising and/or via such intermediate system/s. Providing information may be for radio transmission and/or for transmission via an air interface and/or utilising a RAN or radio node as described herein. Connecting the information system to a target, and/or providing information, may be based on a target indication, and/or adaptive to a target indication. A target indication may indicate the target, and/or one or more parameters of transmission pertaining to the target and/or the paths or connections over which the information is provided to the target. Such parameter/s may in particular pertain to the air interface and/or radio access network and/or radio node and/or network node. Example parameters may indicate for example type and/or nature of the target, and/or transmission capacity (e.g., data rate) and/or latency and/or reliability and/or cost, respectively one or more estimates thereof. The target indication may be provided by the target, or determined by the information system, e.g. based on information received from the target and/or historical information, and/or be provided by a user, for example a user operating the target or a device in communication with the target, e.g. via the RAN and/or air interface. For example, a user may indicate on a user equipment communicating with the information system that information is to be provided via a RAN, e.g. by selecting from a selection provided by the information system, for example on a user application or user interface, which may be a web interface. An information system may comprise one or more information nodes. An information node may generally comprise processing circuitry and/or communication circuitry. In particular, an information system and/or an information node may be implemented as a computer and/or a computer arrangement, e.g. a host computer or host computer arrangement and/or server or server arrangement. In some variants, an interaction server (e.g., web server) of the information system may provide a user interface, and based on user input may trigger transmitting and/or streaming information provision to the user (and/or the target) from another server, which may be connected or connectable to the interaction server and/or be part of the information system or be connected or connectable thereto. The information may be any kind of data, in particular data intended for a user of for use at a terminal, e.g. video data and/or audio data and/or location data and/or interactive data and/or game-related data and/or environmental data and/or technical data and/or traffic data and/or vehicular data and/or circumstantial data and/or operational data. The information provided by the information system may be mapped to, and/or mappable to, and/or be intended for mapping to, communication or data signaling and/or one or more data channels as described herein (which may be signaling or channel/s of an air interface and/or used within a RAN and/or for radio transmission). It may be considered that the information is formatted based on the target indication and/or target, e.g. regarding data amount and/or data rate and/or data structure and/or timing, which in particular may be pertaining to a mapping to communication or data signaling and/or a data channel. Mapping information to data signaling and/or data channel/s may be considered to refer to using the signaling/channel/s to carry the data, e.g. on higher layers of communication, with the signaling/channel/s underlying the transmission. A target indication generally may comprise different components, which may have different sources, and/or which may indicate different characteristics of the target and/or communication path/s thereto. A format of information may be specifically selected, e.g. from a set of different formats, for information to be transmitted on an air interface and/or by a RAN as described herein. This may be particularly pertinent since an air interface may be limited in terms of capacity and/or of predictability, and/or potentially be cost sensitive. The format may be selected to be adapted to the transmission indication, which may in particular indicate that a RAN or radio node as described herein is in the path (which may be the indicated and/or planned and/or expected path) of information between the target and the information system. A (communication) path of information may represent the interface/s (e.g., air and/or cable interfaces) and/or the intermediate system/s (if any), between the information system and/or the node providing or transferring the information, and the target, over which the information is, or is to be, passed on. A path may be (at least partly) undetermined when a target indication is provided, and/or the information is provided/transferred by the information system, e.g. if an internet is involved, which may comprise multiple, dynamically chosen paths. Information and/or a format used for information may be packet-based, and/or be mapped, and/or be mappable and/or be intended for mapping, to packets. Alternatively, or additionally, there may be considered a method for operating a target device comprising providing a target indicating to an information system. More alternatively, or additionally, a target device may be considered, the target device being adapted for providing a target indication to an information system. In another approach, there may be considered a target indication tool adapted for, and/or comprising an indication module for, providing a target indication to an information system. The target device may generally be a target as described above. A target indication tool may comprise, and/or be implemented as, software and/or application or app, and/or web interface or user interface, and/or may comprise one or more modules for implementing actions performed and/or controlled by the tool. The tool and/or target device may be adapted for, and/or the method may comprise, receiving a user input, based on which a target indicating may be determined and/or provided. Alternatively, or additionally, the tool and/or target device may be adapted for, and/or the method may comprise, receiving information and/or communication signaling carrying information, and/or operating on, and/or presenting (e.g., on a screen and/or as audio or as other form of indication), information. The information may be based on received information and/or communication signaling carrying information. Presenting information may comprise processing received information, e.g. decoding and/or transforming, in particular between different formats, and/or for hardware used for presenting. Operating on information may be independent of or without presenting, and/or proceed or succeed presenting, and/or may be without user interaction or even user reception, for example for automatic processes, or target devices without (e.g., regular) user interaction like MTC devices, of for automotive or transport or industrial use. The information or communication signaling may be expected and/or received based on the target indication. Presenting and/or operating on information may generally comprise one or more processing steps, in particular decoding and/or executing and/or interpreting and/or transforming information. Operating on information may generally comprise relaying and/or transmitting the information, e.g. on an air interface, which may include mapping the information onto signaling (such mapping may generally pertain to one or more layers, e.g. one or more layers of an air interface, e.g. RLC (Radio Link Control) layer and/or MAC layer and/or physical layer/s). The information may be imprinted (or mapped) on communication signaling based on the target indication, which may make it particularly suitable for use in a RAN (e.g., for a target device like a network node or in particular a UE or terminal). The tool may generally be adapted for use on a target device, like a UE or terminal. Generally, the tool may provide multiple functionalities, e.g. for providing and/or selecting the target indication, and/or presenting, e.g. video and/or audio, and/or operating on and/or storing received information. Providing a target indication may comprise transmitting or transferring the indication as signaling, and/or carried on signaling, in a RAN, for example if the target device is a UE, or the tool for a UE. It should be noted that such provided information may be transferred to the information system via one or more additionally communication interfaces and/or paths and/or connections. The target indication may be a higher-layer indication and/or the information provided by the information system may be higher-layer information, e.g. application layer or user-layer, in particular above radio layers like transport layer and physical layer. The target indication may be mapped on physical layer radio signaling, e.g. related to or on the user-plane, and/or the information may be mapped on physical layer radio communication signaling, e.g. related to or on the user-plane (in particular, in reverse communication directions). The described approaches allow a target indication to be provided, facilitating information to be provided in a specific format particularly suitable and/or adapted to efficiently use an air interface. A user input may for example represent a selection from a plurality of possible transmission modes or formats, and/or paths, e.g. in terms of data rate and/or packaging and/or size of information to be provided by the information system.

In general, a numerology and/or subcarrier spacing may indicate the bandwidth (in frequency domain) of a subcarrier of a carrier, and/or the number of subcarriers in a carrier and/or the numbering of the subcarriers in a carrier, and/or the symbol time length. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths, even on the same carrier.

Signaling may generally comprise one or more (e.g., modulation) symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

An antenna arrangement may comprise one or more antenna elements (radiating elements), which may be combined in antenna arrays. An antenna array or subarray may comprise one antenna element, or a plurality of antenna elements, which may be arranged e.g. two dimensionally (for example, a panel) or three dimensionally. It may be considered that each antenna array or subarray or element is separately controllable, respectively that different antenna arrays are controllable separately from each other. A single antenna element/radiator may be considered the smallest example of a subarray. Examples of antenna arrays comprise one or more multi-antenna panels or one or more individually controllable antenna elements. An antenna arrangement may comprise a plurality of antenna arrays. It may be considered that an antenna arrangement is associated to a (specific and/or single) radio node, e.g. a configuring or informing or scheduling radio node, e.g. to be controlled or controllable by the radio node. An antenna arrangement associated to a UE or terminal may be smaller (e.g., in size and/or number of antenna elements or arrays) than the antenna arrangement associated to a network node. Antenna elements of an antenna arrangement may be configurable for different arrays, e.g. to change the beamforming characteristics. In particular, antenna arrays may be formed by combining one or more independently or separately controllable antenna elements or subarrays. The beams may be provided by analog beamforming, or in some variants by digital beamforming, or by hybrid beamforming combing analog and digital beamforming. The informing radio nodes may be configured with the manner of beam transmission, e.g. by transmitting a corresponding indicator or indication, for example as beam identify indication. However, there may be considered cases in which the informing radio node/s are not configured with such information, and/or operate transparently, not knowing the way of beamforming used. An antenna arrangement may be considered separately controllable in regard to the phase and/or amplitude/power and/or gain of a signal feed to it for transmission, and/or separately controllable antenna arrangements may comprise an independent or separate transmit and/or receive unit and/or ADC (Analog-Digital-Converter, alternatively an ADC chain) or DCA (Digital-to-Analog Converter, alternatively a DCA chain) to convert digital control information into an analog antenna feed for the whole antenna arrangement (the ADC/DCA may be considered part of, and/or connected or connectable to, antenna circuitry) or vice versa. A scenario in which an ADC or DCA is controlled directly for beamforming may be considered an analog beamforming scenario; such controlling may be performed after encoding/decoding and/or after modulation symbols have been mapped to resource elements. This may be on the level of antenna arrangements using the same ADC/DCA, e.g. one antenna element or a group of antenna elements associated to the same ADC/DCA. Digital beamforming may correspond to a scenario in which processing for beamforming is provided before feeding signaling to the ADC/DCA, e.g. by using one or more precoder/s and/or by precoding information, for example before and/or when mapping modulation symbols to resource elements. Such a precoder for beamforming may provide weights, e.g. for amplitude and/or phase, and/or may be based on a (precoder) codebook, e.g. selected from a codebook. A precoder may pertain to one beam or more beams, e.g. defining the beam or beams. The codebook may be configured or configurable, and/or be predefined. DFT beamforming may be considered a form of digital beamforming, wherein a DFT procedure is used to form one or more beams. Hybrid forms of beamforming may be considered.

A beam may be defined by a spatial and/or angular and/or spatial angular distribution of radiation and/or a spatial angle (also referred to as solid angle) or spatial (solid) angle distribution into which radiation is transmitted (for transmission beamforming) or from which it is received (for reception beamforming). Reception beamforming may comprise only accepting signals coming in from a reception beam (e.g., using analog beamforming to not receive outside reception beam/s), and/or sorting out signals that do not come in in a reception beam, e.g. in digital postprocessing, e.g. digital beamforming. A beam may have a solid angle equal to or smaller than 4*pi sr (4*pi correspond to a beam covering all directions), in particular smaller than 2*pi, or pi, or pi/2, or pi/4 or pi/8 or pi/16. In particular for high frequencies, smaller beams may be used. Different beams may have different directions and/or sizes (e.g., solid angle and/or reach). A beam may have a main direction, which may be defined by a main lobe (e.g., center of the main lobe, e.g. pertaining to signal strength and/or solid angle, which may be averaged and/or weighted to determine the direction), and may have one or more sidelobes. A lobe may generally be defined to have a continuous or contiguous distribution of energy and/or power transmitted and/or received, e.g. bounded by one or more contiguous or contiguous regions of zero energy (or practically zero energy). A main lobe may comprise the lobe with the largest signal strength and/or energy and/or power content. However, sidelobes usually appear due to limitations of beamforming, some of which may carry signals with significant strength, and may cause multi-path effects. A sidelobe may generally have a different direction than a main lobe and/or other side lobes, however, due to reflections a sidelobe still may contribute to transmitted and/or received energy or power. A beam may be swept and/or switched over time, e.g., such that its (main) direction is changed, but its shape (angular/solid angle distribution) around the main direction is not changed, e.g. from the transmitter's views for a transmission beam, or the receiver's view for a reception beam, respectively. Sweeping may correspond to continuous or near continuous change of main direction (e.g., such that after each change, the main lobe from before the change covers at least partly the main lobe after the change, e.g. at least to 50 or 75 or 90 percent). Switching may correspond to switching direction non-continuously, e.g. such that after each change, the main lobe from before the change does not cover the main lobe after the change, e.g. at most to 50 or 25 or 10 percent.

Signal strength may be a representation of signal power and/or signal energy, e.g. as seen from a transmitting node or a receiving node. A beam with larger strength at transmission (e.g., according to the beamforming used) than another beam does may not necessarily have larger strength at the receiver, and vice versa, for example due to interference and/or obstruction and/or dispersion and/or absorption and/or reflection and/or attrition or other effects influencing a beam or the signaling it carries. Signal quality may in general be a representation of how well a signal may be received over noise and/or interference. A beam with better signal quality than another beam does not necessarily have a larger beam strength than the other beam. Signal quality may be represented for example by SIR, SNR, SINR, BER, BLER, Energy per resource element over noise/interference or another corresponding quality measure. Signal quality and/or signal strength may pertain to, and/or may be measured with respect to, a beam, and/or specific signaling carried by the beam, e.g. reference signaling and/or a specific channel, e.g. a data channel or control channel.

Uplink or sidelink signaling may be OFDMA (Orthogonal Frequency Division Multiple Access) or SC-FDMA (Single Carrier Frequency Division Multiple Access) signaling. Downlink signaling may in particular be OFDMA signaling. However, signaling is not limited thereto (Filter-Bank based signaling and/or Single-Carrier based signaling, e.g. SC-FDE signaling, may be considered alternatives).

A radio node may generally be considered a device or node adapted for wireless and/or radio (and/or millimeter wave) frequency communication, and/or for communication utilising an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or transmission point (TP) and/or access point (AP) and/or other node, in particular for a RAN or other wireless communication network as described herein.

The terms user equipment (UE) and terminal may be considered to be interchangeable in the context of this disclosure. A wireless device, user equipment or terminal may represent an end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary. A wireless device generally may comprise, and/or be implemented as, processing circuitry and/or radio circuitry, which may comprise one or more chips or sets of chips. The circuitry and/or circuitries may be packaged, e.g. in a chip housing, and/or may have one or more physical interfaces to interact with other circuitry and/or for power supply. Such a wireless device may be intended for use in a user equipment or terminal.

A radio node may generally comprise processing circuitry and/or radio circuitry. A radio node, in particular a network node, may in some cases comprise cable circuitry and/or communication circuitry, with which it may be connected or connectable to another radio node and/or a core network.

Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM).

Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas and/or antenna arrays. An antenna array may comprise one or more antennas, which may be arranged in a dimensional array, e.g. 2D or 3D array, and/or antenna panels. A remote radio head (RRH) may be considered as an example of an antenna array. However, in some variants, an RRH may be also be implemented as a network node, depending on the kind of circuitry and/or functionality implemented therein.

Communication circuitry may comprise radio circuitry and/or cable circuitry. Communication circuitry generally may comprise one or more interfaces, which may be air interface/s and/or cable interface/s and/or optical interface/s, e.g. laser-based. Interface/s may be in particular packet-based. Cable circuitry and/or a cable interfaces may comprise, and/or be connected or connectable to, one or more cables (e.g., optical fiber-based and/or wire-based), which may be directly or indirectly (e.g., via one or more intermediate systems and/or interfaces) be connected or connectable to a target, e.g. controlled by communication circuitry and/or processing circuitry.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries. A program product as described herein may comprise the modules related to a device on which the program product is intended (e.g., a user equipment or network node) to be executed (the execution may be performed on, and/or controlled by the associated circuitry).

A wireless communication network may be or comprise a radio access network and/or a backhaul network (e.g. a relay or backhaul network or an IAB network), and/or a Radio Access Network (RAN) in particular according to a communication standard. A communication standard may in particular a standard according to 3GPP and/or 5G, e.g. according to NR or LTE, in particular LTE Evolution.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes, and/or one or more terminals, and/or one or more radio nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary. A RAN or a wireless communication network may comprise at least one network node and a UE, or at least two radio nodes. There may be generally considered a wireless communication network or system, e.g. a RAN or RAN system, comprising at least one radio node, and/or at least one network node and at least one terminal.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Control information or a control information message or corresponding signaling (control signaling) may be transmitted on a control channel, e.g. a physical control channel, which may be a downlink channel or (or a sidelink channel in some cases, e.g. one UE scheduling another UE). For example, control information/allocation information may be signaled by a network node on PDCCH (Physical Downlink Control Channel) and/or a PDSCH (Physical Downlink Shared Channel) and/or a HARQ-specific channel. Acknowledgement signaling, e.g. as a form of control information or signaling like uplink control information/signaling, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

Signaling may generally be considered to represent an electromagnetic wave structure (e.g., over a time interval and frequency interval), which is intended to convey information to at least one specific or generic (e.g., anyone who might pick up the signaling) target. A process of signaling may comprise transmitting the signaling. Transmitting signaling, in particular control signaling or communication signaling, e.g. comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation. Error detection coding may comprise, and/or be based on, parity or checksum approaches, e.g. CRC (Cyclic Redundancy Check). Forward error correction coding may comprise and/or be based on for example turbo coding and/or Reed-Muller coding, and/or polar coding and/or LDPC coding (Low Density Parity Check). The type of coding used may be based on the channel (e.g., physical channel) the coded signal is associated to. A code rate may represent the ratio of the number of information bits before encoding to the number of encoded bits after encoding, considering that encoding adds coding bits for error detection coding and forward error correction. Coded bits may refer to information bits (also called systematic bits) plus coding bits.

Communication signaling may comprise, and/or represent, and/or be implemented as, data signaling, and/or user plane signaling. Communication signaling may be associated to a data channel, e.g. a physical downlink channel or physical uplink channel or physical sidelink channel, in particular a PDSCH (Physical Downlink Shared Channel) or PSSCH (Physical Sidelink Shared Channel). Generally, a data channel may be a shared channel or a dedicated channel. Data signaling may be signaling associated to and/or on a data channel.

An indication generally may explicitly and/or implicitly indicate the information it represents and/or indicates. Implicit indication may for example be based on position and/or resource used for transmission. Explicit indication may for example be based on a parametrisation with one or more parameters, and/or one or more index or indices, and/or one or more bit patterns representing the information. It may in particular be considered that control signaling as described herein, based on the utilised resource sequence, implicitly indicates the control signaling type.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE. As symbol time length and/or subcarrier spacing (and/or numerology) may be different between different symbols and/or subcarriers, different resource elements may have different extension (length/width) in time and/or frequency domain, in particular resource elements pertaining to different carriers.

A resource generally may represent a time-frequency and/or code resource, on which signaling, e.g. according to a specific format, may be communicated, for example transmitted and/or received, and/or be intended for transmission and/or reception.

A border symbol may generally represent a starting symbol or an ending symbol for transmitting and/or receiving. A starting symbol may in particular be a starting symbol of uplink or sidelink signaling, for example control signaling or data signaling. Such signaling may be on a data channel or control channel, e.g. a physical channel, in particular a physical uplink shared channel (like PUSCH) or a sidelink data or shared channel, or a physical uplink control channel (like PUCCH) or a sidelink control channel. If the starting symbol is associated to control signaling (e.g., on a control channel), the control signaling may be in response to received signaling (in sidelink or downlink), e.g. representing acknowledgement signaling associated thereto, which may be HARQ or ARQ signaling. An ending symbol may represent an ending symbol (in time) of downlink or sidelink transmission or signaling, which may be intended or scheduled for the radio node or user equipment. Such downlink signaling may in particular be data signaling, e.g. on a physical downlink channel like a shared channel, e.g. a PDSCH (Physical Downlink Shared Channel). A starting symbol may be determined based on, and/or in relation to, such an ending symbol.

Configuring a radio node, in particular a terminal or user equipment, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilise, and/or be adapted to utilise, its circuitry/ies for configuring. Allocation information may be considered a form of configuration data. Configuration data may comprise and/or be represented by configuration information, and/or one or more corresponding indications and/or message/s Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor.

A resource structure may be considered to be neighbored in frequency domain by another resource structure, if they share a common border frequency, e.g. one as an upper frequency border and the other as a lower frequency border. Such a border may for example be represented by the upper end of a bandwidth assigned to a subcarrier n, which also represents the lower end of a bandwidth assigned to a subcarrier n+1. A resource structure may be considered to be neighbored in time domain by another resource structure, if they share a common border time, e.g. one as an upper (or right in the figures) border and the other as a lower (or left in the figures) border. Such a border may for example be represented by the end of the symbol time interval assigned to a symbol n, which also represents the beginning of a symbol time interval assigned to a symbol n+1.

Generally, a resource structure being neighbored by another resource structure in a domain may also be referred to as abutting and/or bordering the other resource structure in the domain.

A resource structure may general represent a structure in time and/or frequency domain, in particular representing a time interval and a frequency interval. A resource structure may comprise and/or be comprised of resource elements, and/or the time interval of a resource structure may comprise and/or be comprised of symbol time interval/s, and/or the frequency interval of a resource structure may comprise and/or be comprised of subcarrier/s. A resource element may be considered an example for a resource structure, a slot or mini-slot or a Physical Resource Block (PRB) or parts thereof may be considered others. A resource structure may be associated to a specific channel, e.g. a PUSCH or PUCCH, in particular resource structure smaller than a slot or PRB.

Examples of a resource structure in frequency domain comprise a bandwidth or band, or a bandwidth part. A bandwidth part may be a part of a bandwidth available for a radio node for communicating, e.g. due to circuitry and/or configuration and/or regulations and/or a standard. A bandwidth part may be configured or configurable to a radio node. In some variants, a bandwidth part may be the part of a bandwidth used for communicating, e.g. transmitting and/or receiving, by a radio node. The bandwidth part may be smaller than the bandwidth (which may be a device bandwidth defined by the circuitry/configuration of a device, and/or a system bandwidth, e.g. available for a RAN). It may be considered that a bandwidth part comprises one or more resource blocks or resource block groups, in particular one or more PRBs or PRB groups. A bandwidth part may pertain to, and/or comprise, one or more carriers.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilising millimeter waves, in particular above one of the thresholds 10 GHz or 20 GHz or 50 GHz or 52 GHz or 52.6 GHz or 60 GHz or 72 GHz or 100 GHz or 114 GHz. Such communication may utilise one or more carriers, e.g. in FDD and/or carrier aggregation. Upper frequency boundaries may correspond to 300 GHz or 200 GHz or 120 GHz or any of the thresholds larger than the one representing the lower frequency boundary.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on an LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction. Examples of channels comprise a channel for low latency and/or high reliability transmission, in particular a channel for Ultra-Reliable Low Latency Communication (URLLC), which may be for control and/or data.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of, or associated to, a symbol. Accordingly, different symbols may have different symbol time lengths. In particular, numerologies with different subcarrier spacings may have different symbol time length. Generally, a symbol time length may be based on, and/or include, a guard time interval or cyclic extension, e.g. prefix or postfix.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes.

Sidelink communication may also be referred to as device-to-device (D2D) communication, and/or in some cases as ProSe (Proximity Services) communication, e.g. in the context of LTE. A sidelink may be implemented in the context of V2x communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g. a PSCCH (Physical Sidelink Control CHannel, which may for example carry control information like an acknowledgement position indication, and/or a PSSCH (Physical Sidelink Shared CHannel, which for example may carry data and/or acknowledgement signaling). It may be considered that a sidelink communication channel (or structure) pertains to and/or used one or more carrier/s and/or frequency range/s associated to, and/or being used by, cellular communication, e.g. according to a specific license and/or standard. Participants may share a (physical) channel and/or resources, in particular in frequency domain and/or related to a frequency resource like a carrier) of a sidelink, such that two or more participants transmit thereon, e.g. simultaneously, and/or time-shifted, and/or there may be associated specific channels and/or resources to specific participants, so that for example only one participant transmits on a specific channel or on a specific resource or specific resources, e.g., in frequency domain and/or related to one or more carriers or subcarriers.

A sidelink may comply with, and/or be implemented according to, a specific standard, e.g. an LTE-based standard and/or NR. A sidelink may utilise TDD (Time Division Duplex) and/or FDD (Frequency Division Duplex) technology, e.g. as configured by a network node, and/or preconfigured and/or negotiated between the participants. A user equipment may be considered to be adapted for sidelink communication if it, and/or its radio circuitry and/or processing circuitry, is adapted for utilising a sidelink, e.g. on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

Communication or communicating may generally comprise transmitting and/or receiving signaling. Communication on a sidelink (or sidelink signaling) may comprise utilising the sidelink for communication (respectively, for signaling). Sidelink transmission and/or transmitting on a sidelink may be considered to comprise transmission utilising the sidelink, e.g. associated resources and/or transmission formats and/or circuitry and/or the air interface. Sidelink reception and/or receiving on a sidelink may be considered to comprise reception utilising the sidelink, e.g. associated resources and/or transmission formats and/or circuitry and/or the air interface. Sidelink control information (e.g., SCI) may generally be considered to comprise control information transmitted utilising a sidelink.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be sent over more than one carrier of an aggregate, e.g. one or more PCCs and one PCC and one or more SCCs.

A transmission may generally pertain to a specific channel and/or specific resources, in particular with a starting symbol and ending symbol in time, covering the interval therebetween. A scheduled transmission may be a transmission scheduled and/or expected and/or for which resources are scheduled or provided or reserved. However, not every scheduled transmission has to be realized. For example, a scheduled downlink transmission may not be received, or a scheduled uplink transmission may not be transmitted due to power limitations, or other influences (e.g., a channel on an unlicensed carrier being occupied). A transmission may be scheduled for a transmission timing substructure (e.g., a mini-slot, and/or covering only a part of a transmission timing structure) within a transmission timing structure like a slot. A border symbol may be indicative of a symbol in the transmission timing structure at which the transmission starts or ends.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

A configuration or schedule, like a mini-slot configuration and/or structure configuration, may schedule transmissions, e.g. for the time/transmissions it is valid, and/or transmissions may be scheduled by separate signaling or separate configuration, e.g. separate RRC signaling and/or downlink control information signaling. The transmission/s scheduled may represent signaling to be transmitted by the device for which it is scheduled, or signaling to be received by the device for which it is scheduled, depending on which side of a communication the device is. It should be noted that downlink control information or specifically DCI signaling may be considered physical layer signaling, in contrast to higher layer signaling like MAC (Medium Access Control) signaling or RRC layer signaling. The higher the layer of signaling is, the less frequent/the more time/resource consuming it may be considered, at least partially due to the information contained in such signaling having to be passed on through several layers, each layer requiring processing and handling.

A scheduled transmission, and/or transmission timing structure like a mini-slot or slot, may pertain to a specific channel, in particular a physical uplink shared channel, a physical uplink control channel, or a physical downlink shared channel, e.g. PUSCH, PUCCH or PDSCH, and/or may pertain to a specific cell and/or carrier aggregation. A corresponding configuration, e.g. scheduling configuration or symbol configuration may pertain to such channel, cell and/or carrier aggregation. It may be considered that the scheduled transmission represents transmission on a physical channel, in particular a shared physical channel, for example a physical uplink shared channel or physical downlink shared channel. For such channels, semi-persistent configuring may be particularly suitable.

Generally, a configuration may be a configuration indicating timing, and/or be represented or configured with corresponding configuration data. A configuration may be embedded in, and/or comprised in, a message or configuration or corresponding data, which may indicate and/or schedule resources, in particular semi-persistently and/or semi-statically.

A control region of a transmission timing structure may be an interval in time and/or frequency domain for intended or scheduled or reserved for control signaling, in particular downlink control signaling, and/or for a specific control channel, e.g. a physical downlink control channel like PDCCH. The interval may comprise, and/or consist of, a number of symbols in time, which may be configured or configurable, e.g. by (UE-specific) dedicated signaling (which may be single-cast, for example addressed to or intended for a specific UE), e.g. on a PDCCH, or RRC signaling, or on a multicast or broadcast channel. In general, the transmission timing structure may comprise a control region covering a configurable number of symbols. It may be considered that in general the border symbol is configured to be after the control region in time. A control region may be associated, e.g. via configuration and/or determination, to one or more specific UEs and/or formats of PDCCH and/or DCI and/or identifiers, e.g. UE identifiers and/or RNTIs or carrier/cell identifiers, and/or be represented and/or associated to a CORESET and/or a search space.

The duration of a symbol (symbol time length or interval) of the transmission timing structure may generally be dependent on a numerology and/or carrier, wherein the numerology and/or carrier may be configurable. The numerology may be the numerology to be used for the scheduled transmission.

Scheduling a device, or for a device, and/or related transmission or signaling, may be considered comprising, or being a form of, configuring the device with resources, and/or of indicating to the device resources, e.g. to use for communicating. Scheduling may in particular pertain to a transmission timing structure, or a substructure thereof (e.g., a slot or a mini-slot, which may be considered a substructure of a slot). It may be considered that a border symbol may be identified and/or determined in relation to the transmission timing structure even if for a substructure being scheduled, e.g. if an underlying timing grid is defined based on the transmission timing structure. Signaling indicating scheduling may comprise corresponding scheduling information and/or be considered to represent or contain configuration data indicating the scheduled transmission and/or comprising scheduling information. Such configuration data or signaling may be considered a resource configuration or scheduling configuration. It should be noted that such a configuration (in particular as single message) in some cases may not be complete without other configuration data, e.g. configured with other signaling, e.g. higher layer signaling. In particular, the symbol configuration may be provided in addition to scheduling/resource configuration to identify exactly which symbols are assigned to a scheduled transmission. A scheduling (or resource) configuration may indicate transmission timing structure/s and/or resource amount (e.g., in number of symbols or length in time) for a scheduled transmission.

A scheduled transmission may be transmission scheduled, e.g. by the network or network node. Transmission may in this context may be uplink (UL) or downlink (DL) or sidelink (SL) transmission. A device, e.g. a user equipment, for which the scheduled transmission is scheduled, may accordingly be scheduled to receive (e.g., in DL or SL), or to transmit (e.g. in UL or SL) the scheduled transmission. Scheduling transmission may in particular be considered to comprise configuring a scheduled device with resource/s for this transmission, and/or informing the device that the transmission is intended and/or scheduled for some resources. A transmission may be scheduled to cover a time interval, in particular a successive number of symbols, which may form a continuous interval in time between (and including) a starting symbol and an ending symbol. The starting symbol and the ending symbol of a (e.g., scheduled) transmission may be within the same transmission timing structure, e.g. the same slot. However, in some cases, the ending symbol may be in a later transmission timing structure than the starting symbol, in particular a structure following in time. To a scheduled transmission, a duration may be associated and/or indicated, e.g. in a number of symbols or associated time intervals. In some variants, there may be different transmissions scheduled in the same transmission timing structure. A scheduled transmission may be considered to be associated to a specific channel, e.g. a shared channel like PUSCH or PDSCH.

In the context of this disclosure, there may be distinguished between dynamically scheduled or aperiodic transmission and/or configuration, and semi-static or semi-persistent or periodic transmission and/or configuration. The term "dynamic" or similar terms may generally pertain to configuration/transmission valid and/or scheduled and/or configured for (relatively) short timescales and/or a (e.g., predefined and/or configured and/or limited and/or definite) number of occurrences and/or transmission timing structures, e.g. one or more transmission timing structures like slots or slot aggregations, and/or for one or more (e.g., specific number) of transmission/occurrences. Dynamic configuration may be based on low-level signaling, e.g. control signaling on the physical layer and/or MAC layer, in particular in the form of DCI or SCI. Periodic/semi-static may pertain to longer timescales, e.g. several slots and/or more than one frame, and/or a non-defined number of occurrences, e.g., until a dynamic configuration contradicts, or until a new periodic configuration arrives. A periodic or semi-static configuration may be based on, and/or be configured with, higher-layer signaling, in particular RCL layer signaling and/or RRC signaling and/or MAC signaling.

A transmission timing structure may comprise a plurality of symbols, and/or define an interval comprising several symbols (respectively their associated time intervals). In the context of this disclosure, it should be noted that a reference to a symbol for ease of reference may be interpreted to refer to the time domain projection or time interval or time component or duration or length in time of the symbol, unless it is clear from the context that the frequency domain component also has to be considered. Examples of transmission timing structures include slot, subframe, mini-slot (which also may be considered a substructure of a slot), slot aggregation (which may comprise a plurality of slots and may be considered a superstructure of a slot), respectively their time domain component. A transmission timing structure may generally comprise a plurality of symbols defining the time domain extension (e.g., interval or length or duration) of the transmission timing structure, and arranged neighboring to each other in a numbered sequence. A timing structure (which may also be considered or implemented as synchronisation structure) may be defined by a succession of such transmission timing structures, which may for example define a timing grid with symbols representing the smallest grid structures. A transmission timing structure, and/or a border symbol or a scheduled transmission may be determined or scheduled in relation to such a timing grid. A transmission timing structure of reception may be the transmission timing structure in which the scheduling control signaling is received, e.g. in relation to the timing grid. A transmission timing structure may in particular be a slot or subframe or in some cases, a mini-slot.

Feedback signaling may be considered a form or control signaling, e.g. uplink or sidelink control signaling, like UCI (Uplink Control Information) signaling or SCI (Sidelink Control Information) signaling. Feedback signaling may in particular comprise and/or represent acknowledgement signaling and/or acknowledgement information and/or measurement reporting.

Signaling utilising, and/or on and/or associated to, resources or a resource structure may be signaling covering the resources or structure, signaling on the associated frequency/ies and/or in the associated time interval/s. It may be considered that a signaling resource structure comprises and/or encompasses one or more substructures, which may be associated to one or more different channels and/or types of signaling and/or comprise one or more holes (resource element/s not scheduled for transmissions or reception of transmissions). A resource substructure, e.g. a feedback resource structure, may generally be continuous in time and/or frequency, within the associated intervals. It may be considered that a substructure, in particular a feedback resource structure, represents a rectangle filled with one or more resource elements in time/frequency space. However, in some cases, a resource structure or substructure, in particular a frequency resource range, may represent a non-continuous pattern of resources in one or more domains, e.g. time and/or frequency. The resource elements of a substructure may be scheduled for associated signaling.

It should generally be noted that the number of bits or a bit rate associated to specific signaling that can be carried on a resource element may be based on a modulation and coding scheme (MCS). Thus, bits or a bit rate may be seen as a form of resources representing a resource structure or range in frequency and/or time, e.g. depending on MCS. The MCS may be configured or configurable, e.g. by control signaling, e.g. DCI or MAC (Medium Access Control) or RRC (Radio Resource Control) signaling.

Different formats of for control information may be considered, e.g. different formats for a control channel like a Physical Uplink Control Channel (PUCCH). PUCCH may carry control information or corresponding control signaling, e.g. Uplink Control Information (UCI). UCI may comprise feedback signaling, and/or acknowledgement signaling like HARQ feedback (ACK/NACK), and/or measurement information signaling, e.g. comprising Channel Quality Information (COI), and/or Scheduling Request (SR) signaling and/or beam-related information. One of the supported PUCCH formats may be short, and may e.g. occur at the end of a slot interval, and/or multiplexed and/or neighboring to PUSCH. Similar control information may be provided on a sidelink, e.g. as Sidelink Control Information (SCI), in particular on a (physical) sidelink control channel, like a (P)SCCH.

A scheduling assignment may be configured with control signaling, e.g. downlink control signaling or sidelink control signaling. Such controls signaling may be considered to represent and/or comprise scheduling signaling, which may indicate scheduling information. A scheduling assignment may be considered scheduling information indicating scheduling of signaling/transmission of signaling, in particular pertaining to signaling received or to be received by the device configured with the scheduling assignment. It may be considered that a scheduling assignment may indicate data (e.g., data block or element and/or channel and/or data stream) and/or an (associated) acknowledgement signaling process and/or resource/s on which the data (or, in some cases, reference signaling) is to be received and/or indicate resource/s for associated feedback signaling, and/or a feedback resource range on which associated feedback signaling is to be transmitted. Transmission associated to an acknowledgement signaling process, and/or the associated resources or resource structure, may be configured and/or scheduled, for example by a scheduling assignment. Different scheduling assignments may be associated to different acknowledgement signaling processes. A scheduling assignment may be considered an example of downlink control information or signaling, e.g. if transmitted by a network node and/or provided on downlink (or sidelink control information if transmitted using a sidelink and/or by a user equipment).

A scheduling grant (e.g., uplink grant) may represent control signaling (e.g., downlink control information/signaling). It may be considered that a scheduling grant configures the signaling resource range and/or resources for uplink (or sidelink) signaling, in particular uplink control signaling and/or feedback signaling, e.g. acknowledgement signaling. Configuring the signaling resource range and/or resources may comprise configuring or scheduling it for transmission by the configured radio node. A scheduling grant may indicate a channel and/or possible channels to be used/usable for the feedback signaling, in particular whether a shared channel like a PUSCH may be used/is to be used. A scheduling grant may generally indicate uplink resource/s and/or an uplink channel and/or a format for control information pertaining to associated scheduling assignments. Both grant and assignment/s may be considered (downlink or sidelink) control information, and/or be associated to, and/or transmitted with, different messages.

A resource structure in frequency domain (which may be referred to as frequency interval and/or range) may be represented by a subcarrier grouping. A subcarrier grouping may comprise one or more subcarriers, each of which may represent a specific frequency interval, and/or bandwidth.

The bandwidth of a subcarrier, the length of the interval in frequency domain, may be determined by the subcarrier spacing and/or numerology. The subcarriers may be arranged such that each subcarrier neighbours at least one other subcarrier of the grouping in frequency space (for grouping sizes larger than 1). The subcarriers of a grouping may be associated to the same carrier, e.g. configurably or configured of predefined. A physical resource block may be considered representative of a grouping (in frequency domain). A subcarrier grouping may be considered to be associated to a specific channel and/or type of signaling, its transmission for such channel or signaling is scheduled and/or transmitted and/or intended and/or configured for at least one, or a plurality, or all subcarriers in the grouping. Such association may be time-dependent, e.g. configured or configurable or predefined, and/or dynamic or semi-static. The association may be different for different devices, e.g. configured or configurable or predefined, and/or dynamic or semi-static. Patterns of subcarrier groupings may be considered, which may comprise one or more subcarrier groupings (which may be associated to same or different signalings/channels), and/or one or more groupings without associated signaling (e.g., as seen from a specific device). An example of a pattern is a comb, for which between pairs of groupings associated to the same signaling/channel there are arranged one or more groupings associated to one or more different channels and/or signaling types, and/or one or more groupings without associated channel/signaling).

Example types of signaling comprise signaling of a specific communication direction, in particular, uplink signaling, downlink signaling, sidelink signaling, as well as reference signaling (e.g., SRS or CRS or CSI-RS), communication signaling, control signaling, and/or signaling associated to a specific channel like PUSCH, PDSCH, PUCCH, PDCCH, PSCCH, PSSCH, etc.).

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM). While described variants may pertain to certain Technical Specifications (TSs) of the Third Generation Partnership Project (3GPP), it will be appreciated that the present approaches, concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

There is generally disclosed:

A1. Method of operating a transmitting node in a millimeter-wave communication network, the method comprising
    transmitting communication signaling in a transmission timing structure, the communication signaling comprising an integer multiple of 2 number N of signaling blocks;
    a subset of M of the signaling blocks representing control signaling;
    the communication signaling further comprising one or more reference signaling elements, the position of the one or more reference signaling elements in the transmission timing structure being dependent on M and/or the location of the M signaling blocks representing control signaling in the transmission timing structure.

A2. Transmitting node for a millimeter-wave communication network, the transmitting node being adapted to
    transmit communication signaling in a transmission timing structure, the communication signaling comprising an integer multiple of 2 number N of signaling blocks;
    a subset of M of the signaling blocks representing control signaling;
    the communication signaling further comprising one or more reference signaling elements, the position of the one or more reference signaling elements in the transmission timing structure being dependent on M and/or the location of the M signaling blocks representing control signaling in the transmission timing structure.

A3. Method of operating a receiving node in a millimeter-wave communication network, the method comprising
    receiving communication signaling in a transmission timing structure, the communication signaling comprising an integer multiple of 2 number N of signaling blocks;
    a subset of M of the signaling blocks representing control signaling;
    the communication signaling further comprising one or more reference signaling elements, the position of the one or more reference signaling elements in the transmission timing structure being dependent on M and/or the location of the M signaling blocks representing control signaling in the transmission timing structure.

A4. Receiving node for a millimeter-wave communication network, the receiving node being adapted to
    receive communication signaling in a transmission timing structure, the communication signaling comprising an integer multiple of 2 number N of signaling blocks;
    a subset of M of the signaling blocks representing control signaling;
    the communication signaling further comprising one or more reference signaling elements, the position of the one or more reference signaling elements in the transmission timing structure being dependent on M and/or the location of the M signaling blocks representing control signaling in the transmission timing structure.

A5. Method or device according to one of the preceding variants, wherein the communication signaling is uplink signaling.

A6. Method or device according to one of the preceding variants, wherein one of the one or more reference signaling elements is prefixed to the first in time domain of the M signaling blocks representing control signaling.

A7. Method or device according to one of the preceding variants, wherein N-M signaling blocks represent data signaling.

A8. Method or device according to one of the preceding variants, wherein N-M signaling blocks representing data signaling are arranged in time before the M signaling blocks representing control signaling.

A9. Method or device according to one of the preceding variants, wherein one reference signaling element is provided at the beginning of the transmission timing structure, and a second reference signaling element is provided between a signaling block representing data signaling and the closest signaling block representing control signaling if a signaling block representing data signaling is included in the transmission timing structure.

A10. Method or device according to one of the preceding variants, wherein the communication signaling is transmitted based on a single carrier waveform.

A11. Program product comprising instructions causing processing circuitry to control and/or perform a method according to one of variants A1, A3 or A5 to A10.

A12. Carrier medium arrangement carrying and/or storing a program product according to variant A11.

Some useful abbreviations comprise

ABBREVIATION EXPLANATION

ACK/NACK Acknowledgment/Negative Acknowledgement
ARQ Automatic Repeat reQuest
BER Bit Error Rate
BLER Block Error Rate
CAZAC Constant Amplitude Zero Cross Correlation
CB Code Block
CBG Code Block Group
CCE Control Channel Element
CDM Code Division Multiplex
CM Cubic Metric
CORESET Control Resource Set
CQI Channel Quality Information
CRC Cyclic Redundancy Check
CRS Common reference signal
CSI Channel State Information
CSI-RS Channel state information reference signal
DAI Downlink Assignment Indicator
DCI Downlink Control Information
DFT Discrete Fourier Transform
DM(-)RS Demodulation reference signal(ing)
eMBB enhanced Mobile BroadBand
FDD Frequency Division Duplex
FDE Frequency Domain Equalisation
FDM Frequency Division Multiplex
HARQ Hybrid Automatic Repeat Request
IAB Integrated Access and Backhaul
IFFT Inverse Fast Fourier Transform
MBB Mobile Broadband
MCS Modulation and Coding Scheme
MIMO Multiple-input-multiple-output
MRC Maximum-ratio combining
MRT Maximum-ratio transmission
MU-MIMO Multiuser multiple-input-multiple-output
OFDM/A Orthogonal Frequency Division Multiplex/Multiple Access
PAPR Peak to Average Power Ratio
PDCCH Physical Downlink Control Channel
PDSCH Physical Downlink Shared Channel
PRACH Physical Random Access CHannel
PRB Physical Resource Block
PUCCH Physical Uplink Control Channel
PUSCH Physical Uplink Shared Channel
(P)SCCH (Physical) Sidelink Control Channel
(P)SSCH (Physical) Sidelink Shared Channel
RAN Radio Access Network
RAT Radio Access Technology
RB Resource Block
RNTI Radio Network Temporary Identifier
RRC Radio Resource Control
RS Reference Signaling
SA Scheduling Assignment
SC-FDE Single Carrier Frequency Domain Equalization
SC-FDM/A Single Carrier Frequency Division Multiplex/Multiple Access
SCI Sidelink Control Information
SINR Signal-to-interference-plus-noise ratio
SIR Signal-to-interference ratio
SNR Signal-to-noise-ratio
SR Scheduling Request
SRS Sounding Reference Signal(ing)
SVD Singular-value decomposition
TB Transport Block
TDD Time Division Duplex
TDM Time Division Multiplex
UCI Uplink Control Information
UE User Equipment
URLLC Ultra Low Latency High Reliability Communication
VL-MIMO Very-large multiple-input-multiple-output
ZF Zero Forcing
ZP Zero-Power, e.g. muted CSI-RS symbol Abbreviations may be considered to follow 3G PP usage if applicable.

What is claimed is:

1. A method of operating a transmitting node in a millimeter-wave communication network, the method comprising:
generating communication signaling in a transmission timing structure, the communication signaling comprising N signaling blocks, N being an integer multiple of 2;
a subset of M consecutive blocks of the signaling blocks representing control signaling, M being a power of 2 and less than N;
a subset of I blocks of the N signaling blocks representing demodulation reference signaling (DMRS) elements, I being an integer greater than one;
N-M-I signaling blocks of the N signaling blocks representing data signaling blocks;
the M consecutive control signaling blocks being preceded by a first adjacent DMRS element and being followed by a second adjacent DMRS elements depending on a number of the M consecutive control signaling blocks, the first adjacent DMRS element and the second adjacent DMRS element having a same reference signaling time domain sequence and indicating a cyclic prefix for the M consecutive control signaling blocks; and transmitting the communication signaling.

2. The method of claim 1, wherein the communication signaling is uplink signaling.

3. The method of claim 1, wherein one of the DMRS elements is prefixed to the first in time domain of the M signaling blocks representing control signaling.

4. The method of claim 1, wherein the first adjacent DMRS element of the DMRS elements is provided at the beginning of the transmission timing structure, and the second adjacent DMRS element of the DMRS elements is provided between a signaling block representing data signaling and a closest signaling block representing control signaling when a signaling block representing data signaling is included in the transmission timing structure.

5. The method of claim 1, wherein the communication signaling is transmitted based on a single carrier waveform.

6. A non-transitory storage medium storing a program product comprising instructions causing processing circuitry to at least one of control and perform a method of operating a transmitting node in a millimeter-wave communication network, the method comprising:

generating communication signaling in a transmission timing structure, the communication signaling comprising N signaling blocks, N being an integer multiple of 2;

a subset of M consecutive blocks of the signaling blocks representing control signaling, M being a power of 2 and less than N;

a subset of I blocks of the N signaling blocks representing demodulation reference signaling (DMRS) elements, I being an integer greater than one;

N-M-I signaling blocks of the N signaling blocks representing data signaling blocks;

the M consecutive control signaling blocks being preceded by a first adjacent DMRS element and being followed by a second adjacent DMRS elements depending on a number of the M consecutive control signaling blocks, the first adjacent DMRS element and the second adjacent DMRS element having a same reference signaling time domain sequence and indicating a cyclic prefix for the M consecutive control signaling blocks; and transmitting the communication signaling.

7. A transmitting node for a millimeter-wave communication network, the transmitting node being configured to:

generate communication signaling in a transmission timing structure, the communication signaling comprising N signaling blocks, N being an integer multiple of 2;

a subset of M consecutive blocks of the signaling blocks representing control signaling, M being a power of 2 and less than N;

a subset of I blocks of the N signaling blocks representing demodulation reference signaling (DMRS) elements, I being an integer greater than one;

N-M-I signaling blocks of the N signaling blocks representing data signaling blocks;

the M consecutive control signaling blocks being preceded by a first adjacent DMRS element and being followed by a second adjacent DMRS elements depending on a number of the M consecutive control signaling blocks, the first adjacent DMRS element and the second adjacent DMRS element having a same reference signaling time domain sequence and indicating a cyclic prefix for the M consecutive control signaling blocks; and transmit the communication signaling.

8. A method of operating a receiving node in a millimeter-wave communication network, the method comprising:

receiving communication signaling in a transmission timing structure, the communication signaling comprising N signaling blocks, N being an integer multiple of 2;

a subset of M consecutive blocks of the signaling blocks representing control signaling, M being a power of 2 and less than N;

a subset of I blocks of the N signaling blocks representing demodulation reference signaling (DMRS) elements, I being an integer greater than one;

N-M-I signaling blocks of the N signaling blocks representing data signaling blocks;

the M consecutive control signaling blocks being preceded by a first adjacent DMRS element and being followed by a second adjacent DMRS elements depending on a number of the M consecutive control signaling blocks, the first adjacent DMRS element and the second adjacent DMRS element having a same reference signaling time domain sequence and indicating a cyclic prefix for the M consecutive control signaling blocks; and demodulating the communication signaling.

9. A receiving node for a millimeter-wave communication network, the receiving node being configured to:

receive communication signaling in a transmission timing structure, the communication signaling comprising N signaling blocks, N being an integer multiple of 2;

a subset of M consecutive blocks of the signaling blocks representing control signaling, M being a power of 2 and less than N;

a subset of I blocks of the N signaling blocks representing demodulation reference signaling (DMRS) elements, I being an integer greater than one;

N-M-I signaling blocks of the N signaling blocks representing data signaling blocks;

the M consecutive control signaling blocks being preceded by a first adjacent DMRS element and being followed by a second adjacent DMRS elements depending on a number of the M consecutive control signaling blocks, the first adjacent DMRS element and the second adjacent DMRS element having a same reference signaling time domain sequence and indicating a cyclic prefix for the M consecutive control signaling blocks; and demodulate the communication signaling.

\* \* \* \* \*